4 Sheets—Sheet 1.

J. E. HINDS.

PRINTING MACHINE.

No. 10,330. Reissued May 22, 1883.

Witnesses:
Henry A. Parker.
Geo. E. Irwin

Inventor:
Joseph E. Hinds.
by Chas. M. Higgins
Atty

4 Sheets—Sheet 2.

J. E. HINDS.

PRINTING MACHINE.

No. 10,330. Reissued May 22, 1883.

Witnesses:
Henry A. Parker
Jno. E. Irwin

Inventor:
Joseph E. Hinds
by Chas. M. Higgins
Atty

4 Sheets—Sheet 3.

J. E. HINDS.

PRINTING MACHINE.

No. 10,330. Reissued May 22, 1883.

Witnesses:
Henry A. Parker
Jno. E. Savin

Inventor:
Joseph E. Hinds
by Chas. M. Higgins
Atty

4 Sheets—Sheet 4.
J. E. HINDS.
PRINTING MACHINE.
No. 10,330. Reissued May 22, 1883.
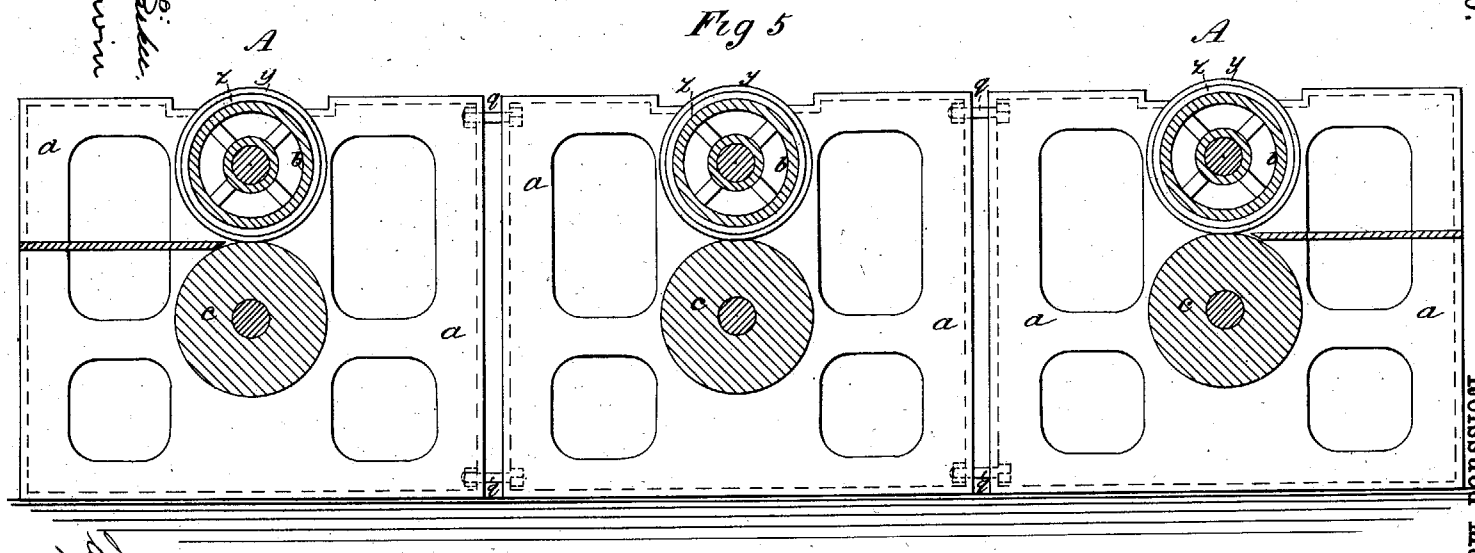
Witnesses:
Henry A. Parker.
Geo. E. Gravin
Inventor:
Jos. E. Hinds
by Chas M. Higgins
atty

UNITED STATES PATENT OFFICE.

JOSEPH E. HINDS, OF BROOKLYN, NEW YORK.

PRINTING-MACHINE.

SPECIFICATION forming part of Reissued Letters Patent No. 10,330, dated May 22, 1883.

Original No. 250,246, dated November 29, 1881. Application for reissue filed November 17, 1882.

*To all whom it may concern:*

Be it known that I, JOSEPH E. HINDS, of Brooklyn, Kings county, New York, have invented certain new and useful Improvements in Printing-Machines, of which the following is a specification.

My invention aims to provide a machine to print in two or more colors, by which each color will be printed independently and perfectly, and the operations performed in a continuous even manner.

To this end my invention consists in the construction and arrangement of the various parts, as more fully hereinafter described, and pointed out in the claims.

Figure 1:
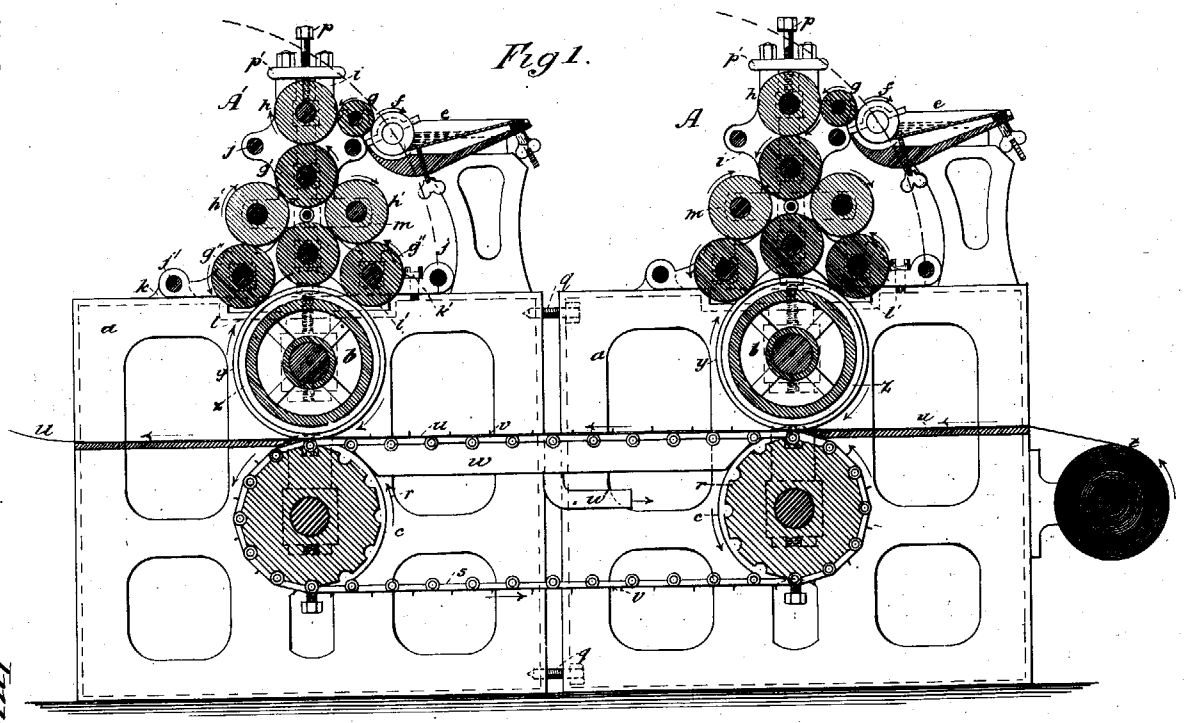
Figure 2:
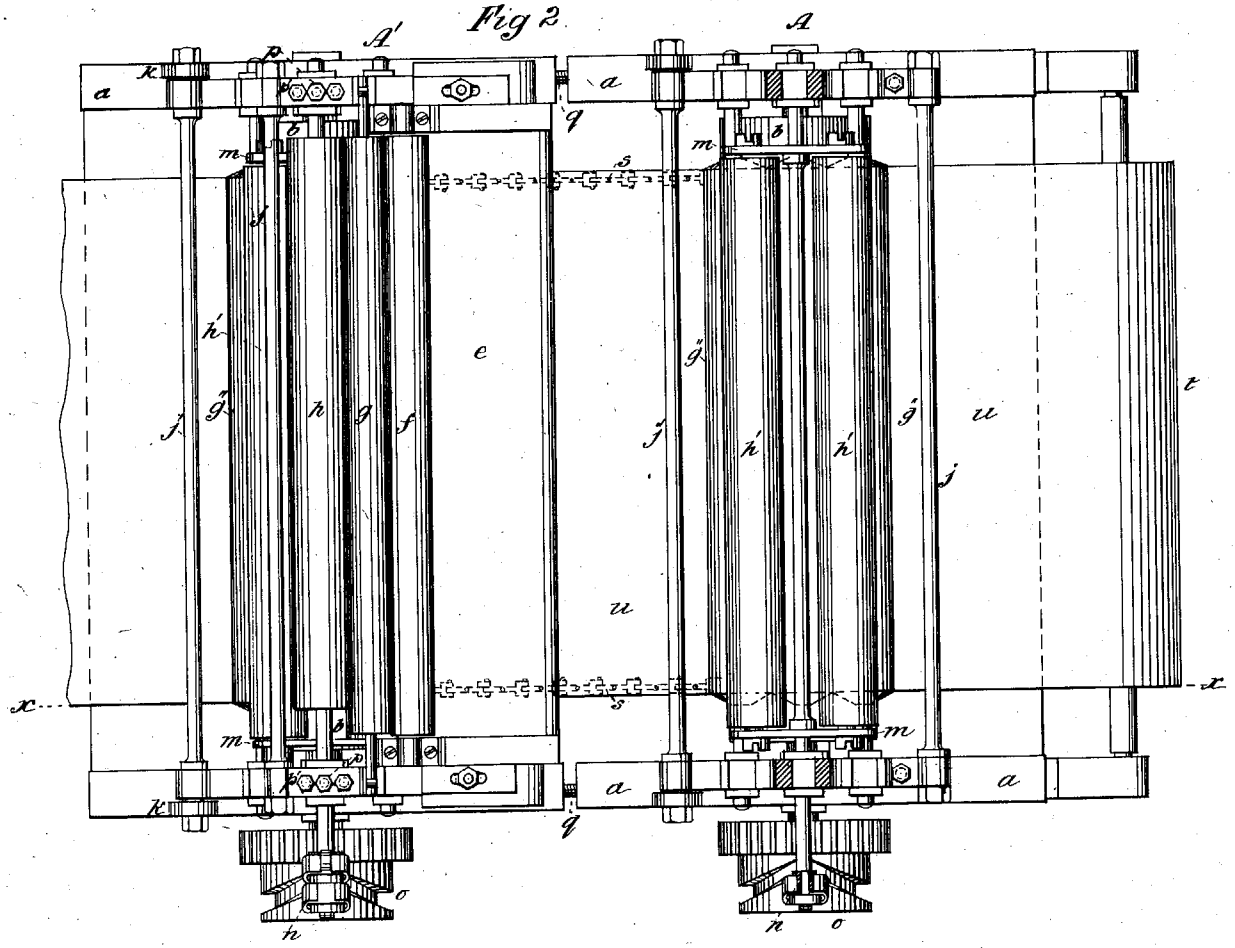
Figure 3:
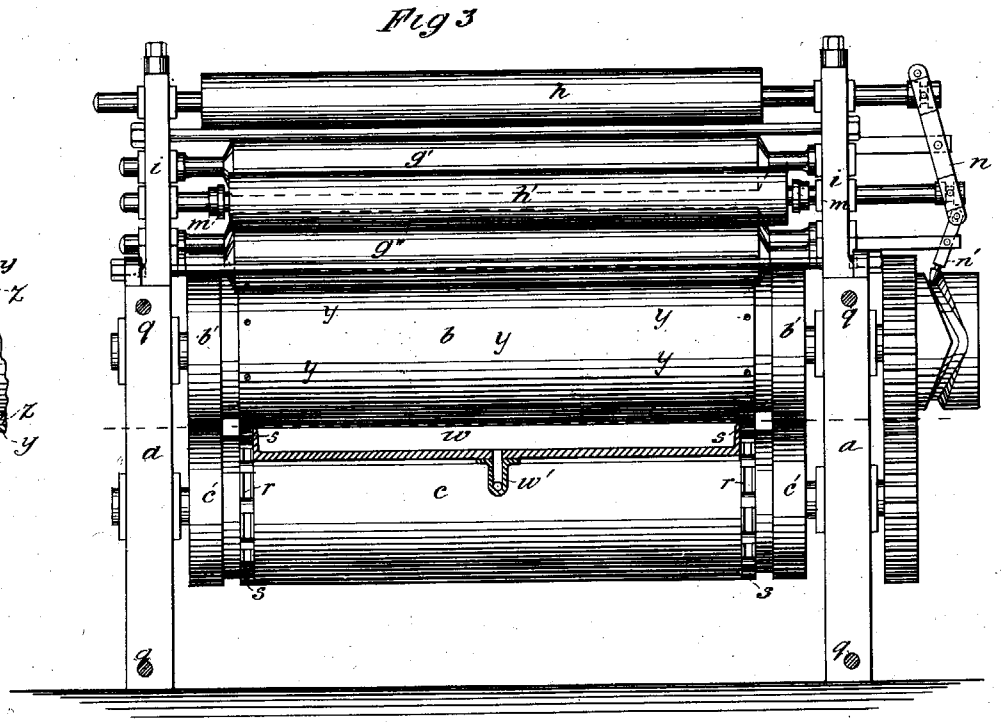
Figure 4:
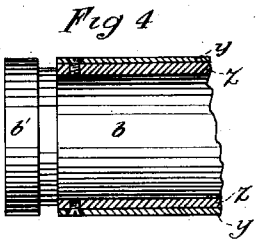

Figure 1 of the drawings annexed gives a side sectional elevation of my improved machine on line *x x* of Fig. 2, which latter shows a plan view thereof, partly in section. Fig. 3 is a cross-section of Fig. 1, between two of the sub-presses, showing the one on the right in end elevation. Fig. 4 is a detail of the printing-cylinder. Fig. 5 is a sectional view, showing three press-frames bolted together.

In Figs. 1 and 2 of the drawings I have shown the machine as composed of two sub-machines connected by a conveyer, and forming one complete or compound machine adapted to print two colors, and in Fig. 5 I have shown three presses bolted together and forming a compound press adapted to print three colors; but any number of sub-machines may be combined together in the same manner, according to the number of colors desired to be printed.

A A′ indicate the sub-machines, which are of similar construction, as may be observed. These consist of sustaining side frames, *a a*, suitably shaped and rigidly joined by cross rods or braces in a substantial manner. Between these side frames are mounted the type-cylinder *b* and impression-cylinder *c*, which are of similar diameter and closely approach each other, the one being placed directly over the other, as shown. The journals of these cylinders revolve in movable or adjustable boxes set in slots in the side frames, as illustrated in Figs. 1 and 2, and are positively geared together in the manner of rolls, as shown in Fig. 3, so as to revolve in unison.

The inking mechanism of each press is placed directly over each type-cylinder. This consists of an ink-fountain, *e*, of ordinary form, mounted on standards rising from the main side frames, as shown best in Fig. 1, and carrying an adjustable ink-knife, which rests against an iron roller, *f*, turning in the ink in the direction shown, and revolving against the composition roller *g*, which revolves against a larger iron roller, *h*, from which the film of ink becomes distributed to a second composition roller, *g′*, thence to two iron rollers, *h′*, and finally to three composition rollers, *g″*, which roll against the top of the type-cylinder and ink the form thereon. This arrangement of inking-rollers, as may be observed, insures a thorough and even distribution of the ink and a perfect inking of the form, and the whole series of ink-rollers, together with the type and impression cylinders, are thus placed in vertical columns, which is both compact and convenient.

The inking-rollers, as may be observed, are mounted in a frame which surmounts the main frame of the press, and consists of two inverted-T-shaped standards, *i i*, joined by stay-rods *j j′*, on one of which, *j′*, the frame is hinged to lugs *k* on the top of the main frame, so that when set-screws *k′* on the opposite side are loosened the frame, with its series of rollers, may be raised and swung back, as indicated by the dotted arc, so as to allow the removal of the type-cylinder from the frame, as will be necessary to allow the displacement and setting up of the forms thereon.

It will be readily understood from Fig. 1 that the journal-boxes of the type-cylinder are movable through a slot in the top of the frame to allow of such removal of the cylinder, and that the boxes are held firmly in position therein when replaced by an adjustable set-screw, *l*, working through a removable plate or bar, *l′*, temporarily fixed over the slot. Now, the composition rollers of the inking mechanism, which in Fig. 1 are indicated by heavier lines, are free to rotate, but have no end motion in their bearings, whereas the iron rollers *h′ h′* are also free to rotate, and have an endwise vibration imparted thereto for the purpose of effecting the more perfect distribution of the ink, as is usual. The lower (or pair of) iron rollers, *h′ h′*, are therefore mounted in a frame, *m*, having a central journal or rod, which passes through a guide-box in the vertical slot in the standards *i i*, as shown in plan in Fig. 2 and elevation in Fig. 3, and which is prolonged at one end to connect to one arm of a lever, *n*, Fig. 3, the opposite arm of which connects to the journal of the upper iron roller, *h*. This lever is actuated by a smaller lever, *n'*, which is vibrated by a cam, *o*, on the gear-wheel of the type-cylinder, so that when the press is in action the upper and lower iron rollers are vibrated to and fro in opposite directions simultaneously with their rotation, for the purpose already stated. I prefer to have the cam *o* formed with an odd number of changes, so that the vibrations of the iron rollers will not occur constantly at the same relative points of the other rollers, whereby the ink-distribution is thus rendered more perfect.

It may be finally noted that the several inking-rollers are mounted in a superposed series in the vertical slot or slots of their frame, and that the whole series are pressed to their work by the screws *p p*, bearing upon the box of the uppermost roller, so that by loosening this screw and removing the top bar, *p'*, the whole set of rollers may be easily removed or replaced, as occasion requires; and this construction, as will be seen, embodies both simplicity and convenience.

It may now be noted from Fig. 1 that the sub-machines are so relatively arranged that the distance between the centers of the two type and impression cylinders is just equal to the circumference thereof, that these cylinders are placed on the same plane, and that the frames of the two machines are joined by screw-bolts *q*, by adjusting which this distance may be exactly regulated. Now, fixed to each impression-cylinder, or forming part thereof, are two chain-wheels, *r r*, (see Figs. 1 and 3,) which are arranged near either end of the cylinder, just at or outside the margin of the form on the type-cylinder, around which wheels endless metallic chains *s* pass from cylinder to cylinder, as shown best in Fig. 1, the top edge of these chains being in true plane with the junction-line of the cylinders. On the extreme ends of the type and impression cylinders rims or bearers *b' c'*, of similar diameter, are formed, which roll in close contact and receive the main rolling or driving pressure, so as to prevent the concentration of this pressure on the form or impression. Within these rims the diameter of each cylinder is slightly reduced for a short distance, and within these reductions on the type-cylinders, and occupying the main central part thereof, is fixed the form. The space on the impression-cylinder corresponding to the form-space on the type-cylinder is of slightly less diameter than the diameter of the form, so as to allow of one or more windings of paper or other packing to make an elastic surface to receive the impression and to allow of the "make-ready" or packing patches, corresponding to the light and heavy portions of the form, so as to produce a perfect print, as will be readily understood by printers.

The chains *s s* are preferably formed of cast-iron links having circular bosses at the joints, which are engaged by corresponding recesses in the periphery of the chain-wheels, as seen in Fig. 1, thus making a positive driving engagement therewith. These chains, hence, connect the two presses positively and move in unison with the two sets of cylinders, and act as a conveyer of the paper or other sheet, *u*, to be printed from one type-cylinder to the next, the chain being provided with projecting spikes *v* to seize the margin of the sheet in a positive manner, as shown, which spikes embed themselves in the soft metal at the margins of the form when passing between the cylinders. The sheet, as may be now observed, passes through the machine in a continuous web from a roll, *t*; and presuming at the commencement of operations that the sheet has been properly seized by the chain and has entered between the first set of cylinders, and that the initial points of the forms on each cylinder are in the same relative position and coincident with the junction-line, it will therefore be seen that if the press is now set in motion the impression from the first cylinder in the first color will be made on the entering sheet, and the sheet will thence advance to meet the second cylinder, at which it will arrive just in time to receive the impression in the second color in perfect register with the first, and while this second impression is being made the first cylinder makes a second impression in the first color, and so on constantly. Hence by this means the sheet takes an uninterrupted course through the press, receiving each color successively and making a multiple number of prints simultaneously, the action being thus rapid and continuous and the printing perfect, for it will be observed that as each colored impression is made from a distinct type-cylinder having its own impression-cylinder, hence the make-ready on each impression-cylinder insures a perfect independent impression of each color. These combined advantages, as may be readily appreciated, thus render my invention an important improvement in color-presses, and guarantee cheap, rapid, and artistic work.

The paper may of course be passed in separate sheets through the machine, instead of in the form of a continuous web from a roll; but the latter is of course most advantageous, and in this case the printed web, as it issues from the machine, may be festooned in loops by a suitable attachment, in the manner usual in printing wall-paper, to allow the printed web to dry; or the issuing web may be cut up into sheets by a suitable shearing attachment, such as now commonly employed, and then piled by a fly or transferred to a drying-machine such as patented to me in March, 1881.

Another important feature of my improved press consists in the hollow suction-table or box *w*, arranged between the chains *s s*, and extending between the impression-cylinders as close as possible to the junction of the same with the type-cylinders, as shown in side elevation in Fig. 1 and cross-section in Fig. 3. The top of this box is flush with the top edge of the chain and with the junction-line of the cylinders, and is extensively perforated, as shown in Fig. 3, and over this perforated top the sheet is drawn by the chain as it passes from one set of rollers to the other, as seen in Fig. 1.

From the bottom of the box a pipe, *w'*, extends to a suction-blower or other exhausting device, whereby the air is drawn from the box, causing a suction on the sheet, which holds it flat and level and prevents all puckering or fluttering in its passage between the rollers, and thus insures a perfect feed of the paper thereto. Furthermore, the suction on the sheet holds it down firmly on the spikes of the chain and prevents it being raised from the same by the adhesion of the ink on the first type-cylinder when rotating from the sheet after making the impression, as would be otherwise liable to occur.

In the drawings I have shown the chains *s s* as serving both as the conveyers of the sheet from press to press, as well as the positive driving connection which operatively couples the presses; but it is thought preferable to employ distinct driving-gear to operatively couple the presses, leaving the chains to serve chiefly as the sheet-conveyer, as machinists will readily understand.

The form on the type-cylinders is preferably made up of stereotype-plates *y y*, (see Figs. 1 and 4,) made in sections, screwed to a cylinder or cylindrical ring of lead or soft metal, *z*, which is filled into a recess formed in the middle or form portion of the cylinder, as shown clearly in said figures, the cylinder of soft metal being turned off true and less than type or printing height, and the plates accurately fastened thereto, so as to form a true cylindrical printing-surface of full printing height. By this means the printing-plates are screwed directly to the metallic surface of the printing-cylinder; and the entire face of the cylinder for receiving and supporting the plates is composed of a cylindrical layer or facing of soft metal, which can be readily drilled at any point, and which will readily admit and firmly hold a screw when screwed into a tight-fitting hole bored therein. Hence the thin printing-plates *y y*, making up the form, can be readily bent to the proper curve to fit upon the soft metal face of the cylinder, and holes may then be drilled through the plates and into the soft metal facing of the cylinder, (see Fig. 4,) after which short screws can be screwed into these holes with an ordinary screw-driver, thus affixing the printing-plates onto the form-cylinder at any desired position in a quick and simple mode and in a perfectly positive and fixed manner, which prevents the possible displacement or detachment of the plates when the press is in action, and thereby obviates the use of all detachable clamps, wedges, or other usual fastening devices which are liable to get loose.

The soft-metal facing has the following advantages over one of hard metal: first, it is much cheaper, because although, if preferred, it may, as above stated, be turned off after it is filled into the recess, yet it is obvious that the iron cylinders may be placed in suitable molds and their facings cast thereon of the right size, requiring no further fitting or other work to make them ready for the reception of the plates; second, the facing can be much more readily drilled; third, by using a drill and screws of the proper proportionate sizes, no tapping of the holes is necessary, as screws can be screwed into soft metal with an ordinary screw-driver without tapping the hole; fourth, the holes can be readily filled up by running melted solder into them, or by driving in a plug of lead and soldering it, should the old holes be found to be in the wrong place when putting on a new plate of a slightly different size. The second and third of these advantages would be found also with a wood facing; but if wood were used the holes, after being used a few times for different plates, would be worn out and would not hold, and plugging said holes would be of little or no use, whereas with soft-metal facing the holes could be readily plugged, and then the plugs soldered fast. As compared with wood facing, a metal facing would have the further advantage of not shrinking, swelling, or warping under the varying states of the atmosphere or dampness due to the washing of the plates. It will be also seen that by making the soft-metal facing of partial printing height, and having the stereotype-plates of the remaining thickness to form the full printing height, the stereotype or printing plates are rendered thin and light, and are much more easily handled and bent to the curve of the cylinder, and a much less amount of metal is required to be melted, molded, and remelted in making and reducing the plates, which greatly facilitates the work.

In lieu of the spikes on the chain to seize the margins of the paper, a suitable form of spring-jaw may be used to grasp the margin, and in lieu of the jointed chains themselves flexible steel or metal bands may be used.

I have shown the hollow perforated air chamber or table *w* as placed beneath the sheet and acting to hold the sheet down by the suction caused by a partial vacuum in the box; but in some cases this may be reversed, the hollow box being placed over the sheet and air forced into the same to produce a blast or air pressure against the sheet to hold it flat against a table placed beneath it. The arrangement shown is, however, preferable.

I am aware that cylinders coated with soft metal have been used in printing to receive strips of metal driven into said soft metal, as in the English Patent No. 3,322 of 1810; but in such case neither stereotype nor any other form of printing plates were employed. To remove the printing-surface, said surface was necessarily separated into its component parts, and before the same or another printing-surface could be employed on said cylinder it was necessary not only to repair or recast the soft metal on the cylinder, but to compose a new printing-surface or recompose the old one and drive it into the cylinder strip by strip. In my plan, on the contrary, the same plate may be easily removed and as easily replaced again and again without recomposition, or a different plate may be readily used on the same cylinder in the intervals between the use of the other plate without any repairing or recasting of the soft metal.

What I claim is—

1. A compound printing-machine composed of two or more distinct sets of type and impression cylinders, each set mounted in a distinct and separate frame, and all rotating in the same direction, in combination with positive mechanism for conveying the paper or sheet successively to said cylinders, said mechanism consisting of endless chains moving in circumferential notched grooves in the impression-cylinder and passing between the type and impression cylinders, substantially as described.

2. The combination, in a printing-machine, of two or more successive type-cylinders and a conveyer to convey the sheet from one to the other, and a hollow air box or chamber arranged closely adjacent to said conveyer along the path of the sheet, with mechanism, substantially as described, for applying through said box or chamber a pneumatic pressure upon the sheet, to hold it flat and firm upon the conveyer by said pneumatic pressure, substantially as herein set forth.

3. In a compound printing-machine, and in combination with the several sets of type and impression cylinders, arranged as described, each impression-cylinder being provided with a circumferential channel or channels, and each channel provided with a regular series of recesses, as specified, a positive feeding mechanism, consisting of an endless chain or chains moving in the channels in the impression-cylinders, each link of said chain or chains having projections to fit into the recesses in the channels, substantially as set forth.

4. In a printing-machine, a series of inking-rollers mounted in superposed order in a sustaining-frame, the boxes of the center roller of the lower series, $g''$, the boxes of the frame holding the next series, $h'$, and the boxes of the two upper rollers, $g'$ $h$, all arranged to move vertically in a common vertical slot of said frame, in which the said series are collectively held and adjusted by set-screws bearing on the outermost box or journal, substantially as herein shown and described.

5. In a printing-machine, the combination, with a conveyer of the sheet to the printing cylinder or cylinders, of a stationary suction air-chamber placed beneath the sheet and adapted to hold the sheet flat and firm on the conveyer by pneumatic pressure, substantially as herein specified.

6. The combination, in a printing-machine, with two or more distinct type-cylinders placed in successive order, and a conveyer moving from one cylinder to the other to convey the sheet from cylinder to cylinder, of the suction table or chamber $w$, over which the sheet is drawn in its passage, substantially as and for the purpose herein set forth.

7. A printing-cylinder formed with a cylindrical surface layer of soft metal, in combination with curved sectional printing-plates placed thereon and screws passing through the plates and screwing into the soft-metal layer, substantially as herein shown and described.

8. A printing-cylinder formed of hard metal, with a cylindrical surface layer of soft metal of partial printing height, in combination with thin printing or stereotype plates of remaining printing height, fastened directly to said soft-metal facing by screws penetrating the same, substantially as herein shown and described.

JOSEPH E. HINDS.

Witnesses:

RICHARD H. THOMAS,

JNO. E. GAVIN.